United States Patent [19]

Bates

[11] Patent Number: 5,172,101
[45] Date of Patent: Dec. 15, 1992

[54] OMNIDIRECTIONAL INPUT DEVICE

[76] Inventor: Joseph P. Bates, 422 Manchester, Batavia, Ill. 60510

[21] Appl. No.: 606,881

[22] Filed: Oct. 31, 1990

[51] Int. Cl.⁵ .............................................. G09G 5/08
[52] U.S. Cl. ............................. 340/706; 340/709; 340/711; 341/34; 273/148 B; 200/5 B
[58] Field of Search .................. 340/706, 709, 711; 341/22, 26, 34; 273/148 B; 200/5 R, 5 B; 178/18, 19, 20

[56] References Cited

U.S. PATENT DOCUMENTS

| | | | |
|---|---|---|---|
| 3,253,258 | 5/1966 | Hughes et al. | 340/146.3 |
| 3,449,516 | 6/1969 | Cameron et al. | 178/18 |
| 3,704,343 | 11/1972 | Howard | 178/30 |
| 4,103,252 | 7/1978 | Bobick | 331/48 |
| 4,246,452 | 1/1981 | Chandler | 340/709 |
| 4,296,406 | 10/1981 | Pearson | 340/166 R |
| 4,306,232 | 12/1981 | Burson | 340/706 |
| 4,319,078 | 3/1982 | Yokoo et al. | 178/18 |
| 4,448,837 | 5/1984 | Ikeda et al. | 428/215 |
| 4,488,017 | 12/1984 | Lee | 200/5 R |
| 4,503,416 | 3/1985 | Kim | 338/99 |
| 4,550,221 | 10/1985 | Mabusth | 178/18 |
| 4,564,079 | 1/1986 | Moore et al. | 178/18 |
| 4,568,798 | 2/1986 | Ambros et al. | 178/18 |
| 4,644,101 | 2/1987 | Jin et al. | 178/18 |
| 4,803,474 | 2/1989 | Kulp | 340/709 |
| 4,870,389 | 9/1989 | Ishiwata et al. | 340/706 |

*Primary Examiner*—Alvin E. Oberley
*Assistant Examiner*—Richard Hjerpe
*Attorney, Agent, or Firm*—Marshall, O'Toole, Gerstein, Murray & Bicknell

[57] ABSTRACT

An omnidirectional input device comprising a circuit board and switches arranged in a directional pattern, each switch having an open and closed position. Each switch further having conductive switch components mounted in directional pattern on a surface of the circuit board and a conductive actuator operably connectable to the switch components to place the switch in either the open or closed position. The omnidirectional input device also includes a plurality of output signal lines coupled to the circuit board and a decoding matrix connected between the conductive switch components and the output signal lines. The decoding matrix determines which of the switches is in the closed position and couples the conductive switch components of a switch in the closed position to one or more of the output signal lines.

1 Claim, 3 Drawing Sheets

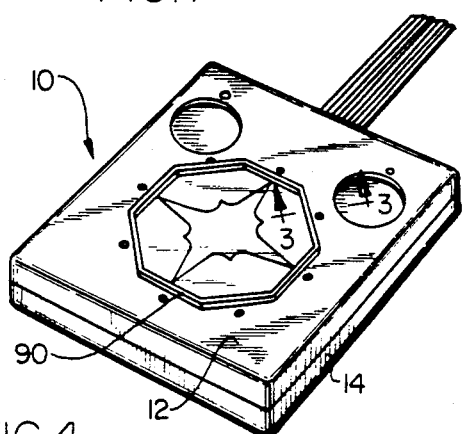
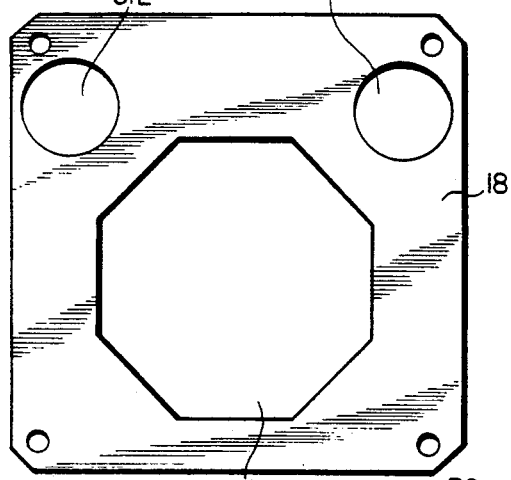
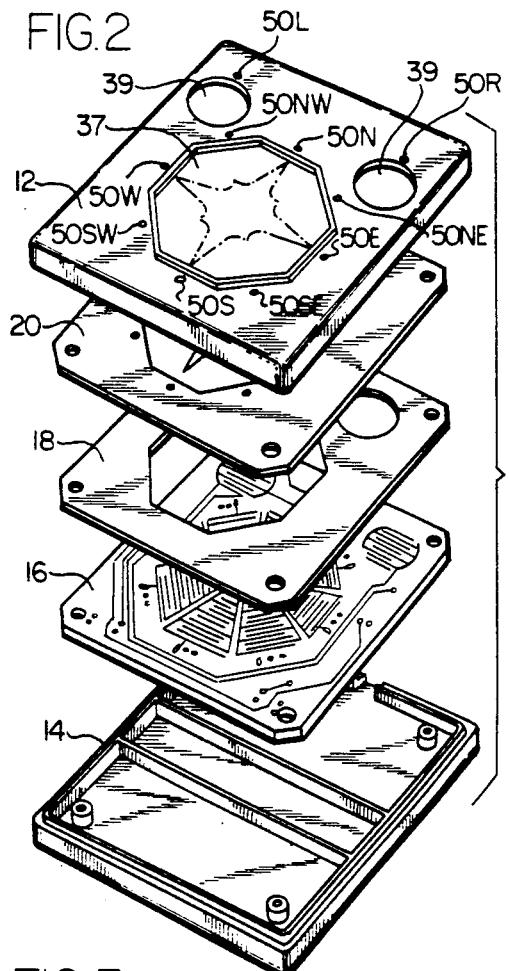
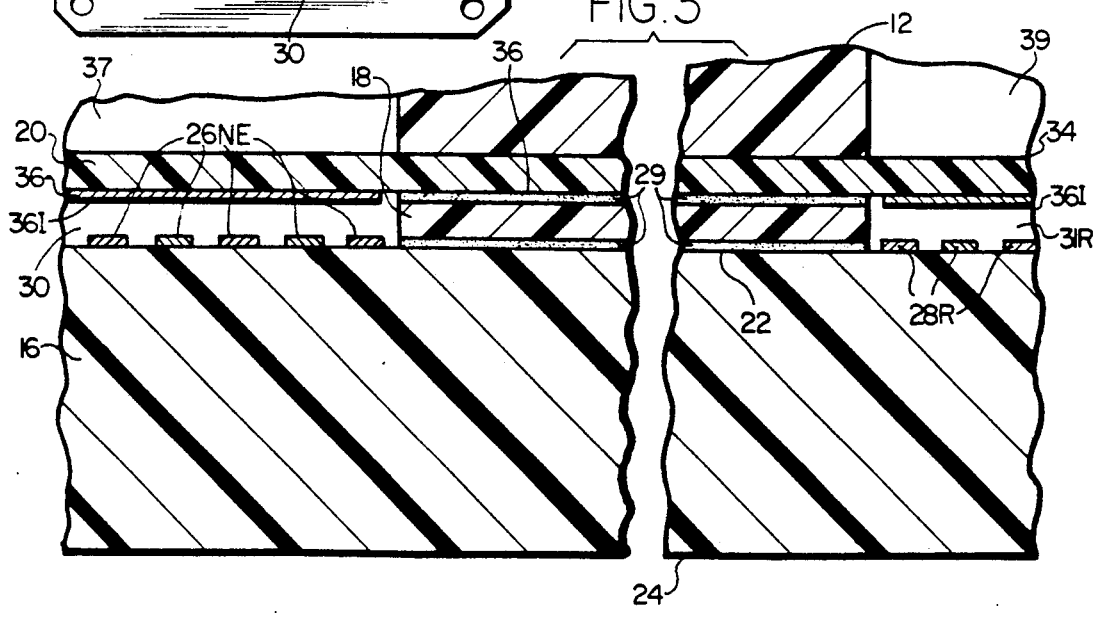

OMNIDIRECTIONAL INPUT DEVICE

FIELD OF THE INVENTION

The present invention relates to control units for video games and the like and more particularly to such a control unit for providing output signals in response to omnidirectional inputs.

BACKGROUND OF THE INVENTION

Control units for electronic or video games are well known in the prior art. Omnidirectional information is normally input by video game control units with a joystick which when moved from its stationary position closes a switch which normally generates an output signal to a computer on a single output line.

The input of directional information with control units equipped with joysticks, however, is relatively slow as compared to the present invention. This slowness is due to several factors. First, a joystick can only be operated with one hand, and second, inputing directional information with a joystick requires the time needed to travel from one directional input position to another. In addition, joysticks cause operator fatigue and do not always allow precise or discrete directional information to be input. Joysticks, being moving parts, are also subject to mechanical failure.

Accordingly, there has been found a need for a reliable, more precise, less fatiguing and faster control units for video games.

SUMMARY OF THE INVENTION

According to the present invention, there is provided an omnidirectional input device comprising a circuit board and switches arranged in a directional pattern, each switch having an open and closed position. Each switch further having conductive switch components mounted in a directional pattern on a surface of the circuit board and an actuating means operably connectable to the switch components to place the switch in either the open or closed position. The omnidirectional input device also includes a plurality of output signal lines coupled to the circuit board and a decoding matrix connected between the conductive switch components and the output signal lines. The decoding matrix determines which of the switches is in the closed position and couples the conductive switch components of a switch in the closed position to one or more of the output signal lines.

BRIEF DESCRIPTION OF THE DRAWINGS

The foregoing and other objects, features and advantages of the invention will be apparent from the following more particular description of an embodiment of the invention, as illustrated in the accompanying drawings in which like reference characters refer to the same parts throughout the different views.

FIG. 1 is a perspective view of the control unit of the current invention.

FIG. 2 is a exploded perspective view better illustrating the internal components of FIG. 1

FIG. 3 is an enlarged fragmented sectional view of a portion of the control unit's internal components taken generally along line 3—3 of FIG. 1.

FIG. 4 is a plan view of a spacer layer.

DETAILED DESCRIPTION

Figure 5:
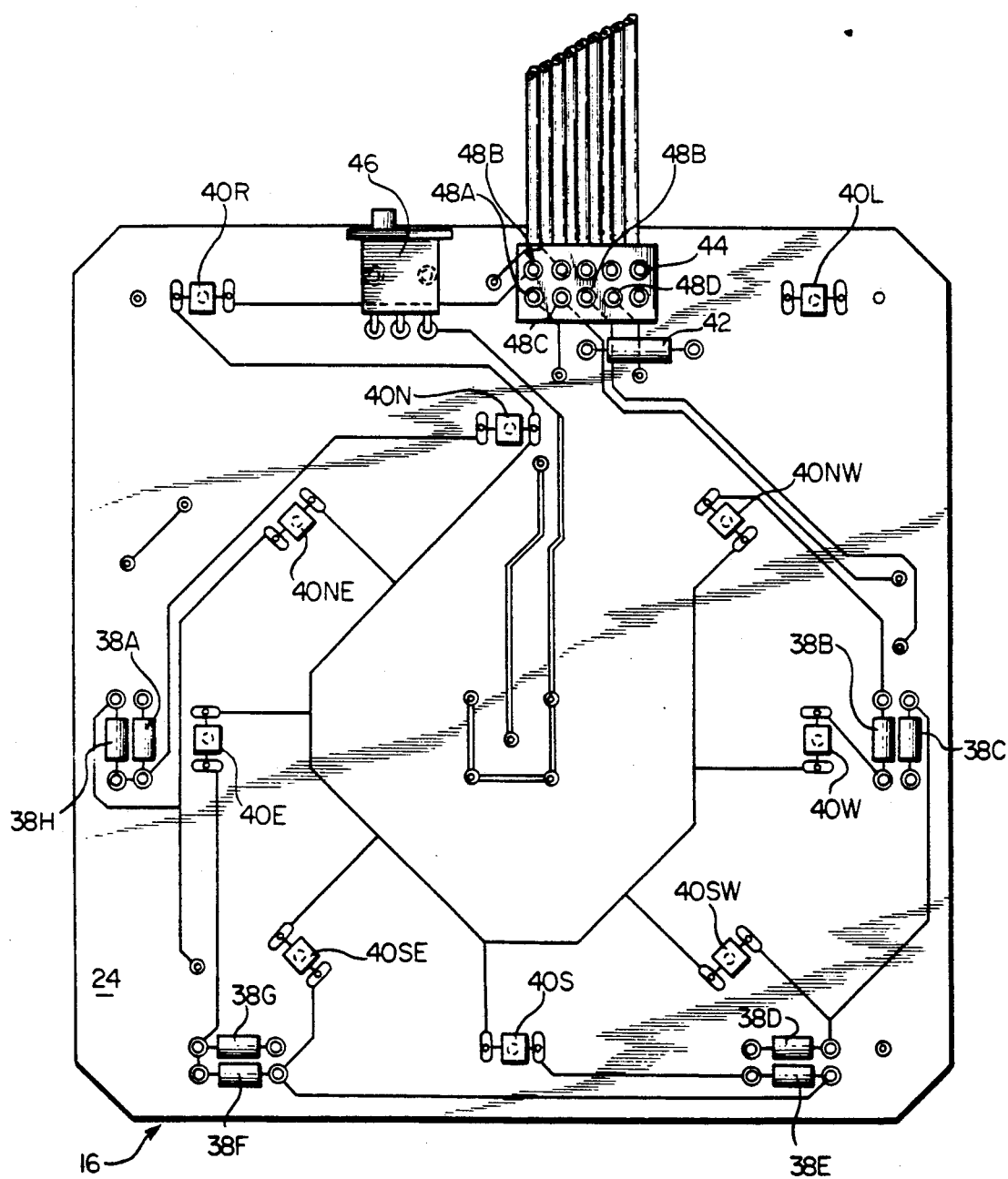
FIG. 5 is plan view of the printed circuitry and components of the bottom side of the circuit board.

FIG. 1 shows a control unit 10. A two part housing having an upper housing member 12 and a lower housing member 14 provides a base structure for the control unit's 10 internal components. The housing member is preferably constructed of a durable material such as a plastic.

Referring to FIG. 2, the major components of the control unit 10 include a circuit board 16, a spacer layer 18, and a combined graphics and conductive layer 20.

Figure 6:
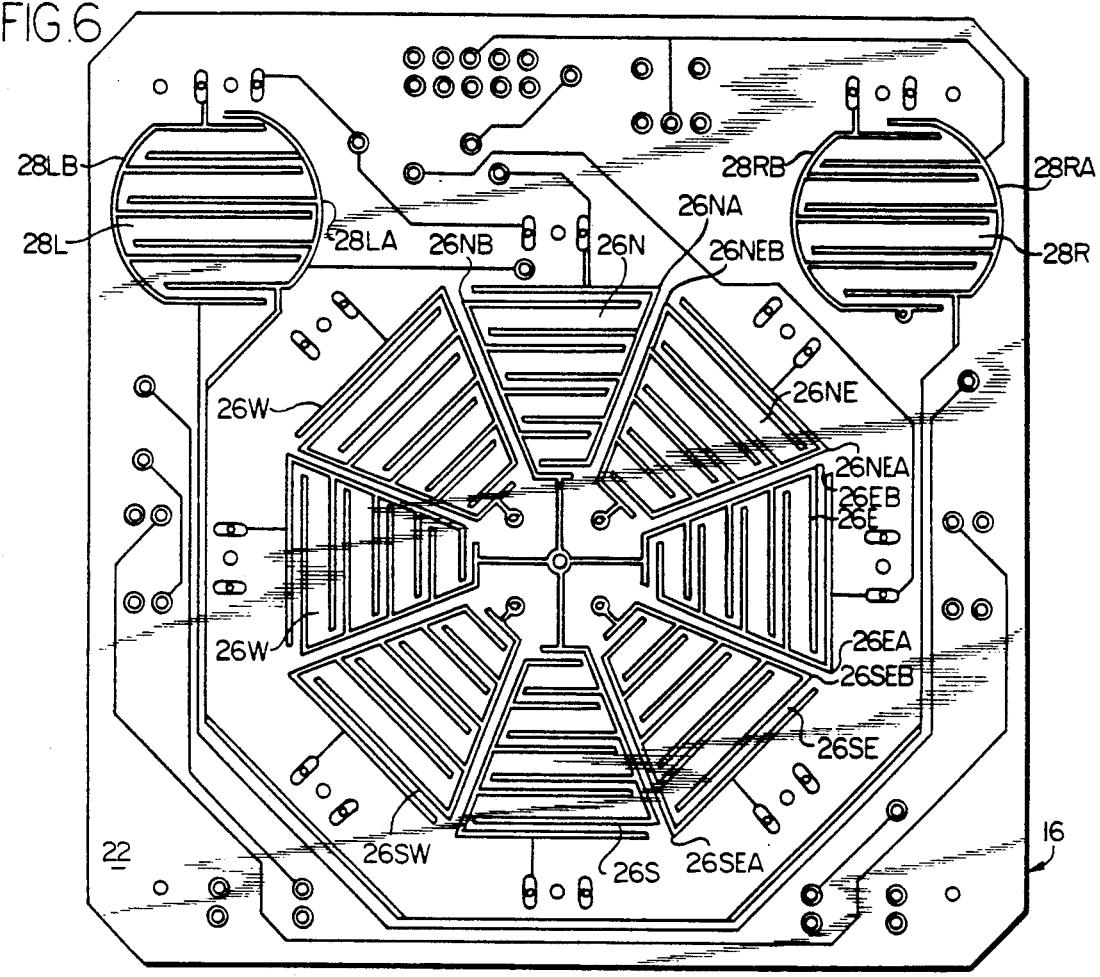
FIG. 6 is a plan view of the printed circuitry of the top side of the circuit board.

Referring to FIGS. 5 and 6, the circuit board 16 has a top side 22 facing the spacer layer 18 and a bottom side 24 facing the lower housing member 14. The top side 22 has eight trapezoidally shaped printed circuit segments (26N, 26NE, 26E, 26SE, 26S, 26SW, 26W, 26NW) mounted thereon that are arranged in a directional octagonal pattern. The shortest parallel side of each trapezoidally shaped circuit segment is located near the center of circuit board 16 and longest parallel side of each trapezoidally shaped circuit segment forms one side of the octagon. There are also two additional circular shaped printed circuit segments 28L and 28R mounted on the top side 22 of the circuit board 16.

Each of these 10 circuit segments 26 and 28 consists of two interleaved but unconnected conductive circuit segment portions (26NA & 26NB, 26NEA & 26NEB 26EA &,,26EB, 26SEA & 26SEB, 26SA & 26SB, 26SWA & 26SWB, 26WA & 26WB, 26NWA & 26NWB, 28LA & 28LB and 28RA & 28RB). For example, circuit segment 26N has circuit segment portions 26NA and 26NB and circular circuit segment 28L has circuit segment portions 28LA and 28LB.

The eight octagonally arranged circuit segments 26 are each respectively a component of one of eight directional switches arranged in a directional pattern that accepts directional input. The two circuit segments 28L and 28R each respectively are a component of one of two auxiliary switches. Switches containing circuit segments 28L and 28R normally are used to accept auxiliary information such as firing or other non directional video game input information.

Attached by adhesive 29 or similar material, above and adjacent to the top side 22 of the circuit board is the spacer layer 18. This layer 18 is made of mylar or a similar non conductive material. The spacer layer 18, as seen in FIG. 4, has an octagonal opening 30 which matches the area of and is above the octagonal area of the eight directional circuit segments 26 and two circular openings 31L and 31R which match the area of and are above the two circular circuit segments 28. As discussed further below, these openings allow the circuit segments 26 and 28 to be capable of coming in contact with the graphics/conductive layer 20.

Mounted atop the spacer layer 18 by adhesive 29 or similar material is the graphics/conductive layer 20. This layer 20 is preferably made of mylar or a similar clear material. The graphics/conductive layer 20 has a top surface 34 and a bottom surface 36.

Graphics are preferably printed on the bottom surface 36 of the graphics/conductive layer 20. These graphics are viewable to an operator, through the clear mylar top surface 34 of the graphics/conductive layer. These graphics include a directional pattern lying over the eight directional circuit segments which guides the operator where to exert pressure, as discussed below, to precisely input directional information (i.e. over one of the eight directional circuit segments), thus allowing directional information to be accurately input. The upper housing member 12, has an octagonal opening 37 and two circular openings 39 which allow the portions of the top surface 34 of this layer 20 lying above the eight directional circuit segments 26 and lying above the two auxiliary circuit segments 28 to be viewable to and to be accessible to downward pressure exerted by an operator.

Printed on top of the graphics on the bottom surface 36 of the graphics/conductive layer 20 is a conductive ink screen 36I or other conductive material. Preferably only the portions of the bottom surface 36 of the graphics/conductive layer 20 lying above the eight directional circuit segments 26 and the two auxiliary segment circuit segments 28 are printed with the conductive ink screen 36I. The conductive ink screen 36I on the bottom surface 36 is adjacent to and generally coextensive with both the eight directional circuit segments 26 and the two auxiliary circuit segments 28. The conductive ink screen 36I on the bottom surface 36 together with the spacer layer 18 and each of the circuit segments 26 and 28 thus form ten discrete individual (eight directional and two auxiliary) switches each having an open and closed position.

The conductive ink screen 36I on the bottom surface 36 is an actuating means to place each switch in the closed position. The spacer layer 18 normally maintains the conductive ink screen surface 36I in a spaced apart relation from the circuit segments 26 and 28, thus keeping the switches in an open position. When downward pressure is applied by an operator to the graphics/conductive layer 20 over one of the circuit segments 26 or 28, the conductive ink screen 36I on the bottom surface 36 passes through either octagonal opening 30 or one of the circular openings 31 of the spacer layer 18 and comes into electrical contact with both interleaved segment portions of a circuit segment 26 or 28 and a switch closure occurs as the two interleaved segment portions of a circuit segment 26 or 28 are electrically connected.

For example, if downward operator pressure is applied to the graphics/conductive layer 20 over circuit segment 26N, the conductive ink screen 36I on the bottom surface 36 would electrically connect circuit segment portion 26NA to circuit segment portion 26NB to place the switch containing these segment portions in the closed position.

Figure 7:
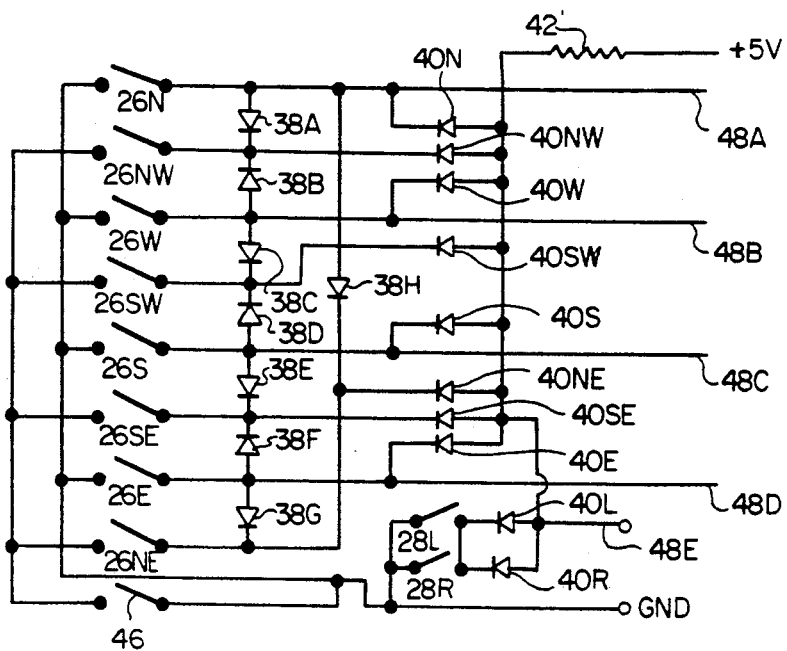
FIG. 7 is a schematic diagram of the circuitry of the control unit.

As seen in FIG. 5, mounted on the bottom side 24 of the circuit board 16 is a series of eight diodes 38A-38H, ten light emitting diodes ("LEDs") 40N, 40NE, 40E, 40SE, 40S, 40SW, 40W, 40NW, 40L, 40R, a resistor 42, such as a 680 ohm resistor, a ribbon connector 44 and a switch 46. Also printed on both the top and bottom surfaces of the circuit board are various circuit lines. As seen in FIGS. 5-7, a portion of the circuit lines that are connected in common are marked with like reference numerals.

As seen in FIG. 7, there are five output signal lines 48A-E. These output lines may be connected to and provide operator input information to a computer, video game machine or similar device via the ribbon connector 44. Output signal lines 48A-D provide directional information and output signal line 48E provides auxiliary information.

As best seen in FIG. 7, the circuitry of the various printed circuit lines and the eight diodes 38A-38H form a diode decoding matrix which determines which of the eight directional switches has been closed and generates eight different output signals by activating one or two of the four directional output signal lines 48A-D. Thus the present invention by providing eight output signals on only four lines, reduces the amount of output lines that are needed from eight to four. (If desired for specific applications, switch 46 can be left open breaking the electrical connection to ground of switches containing circuit segments 26 NE, 26SE, 26SW and 26NW and thereby disabling these switches. The opening of switch 46 allows directional information to be input on only the four switches containing circuit segments 26N, 26S, 26E and 26W.)

LEDs 40N, 40NE, 40E, 40SE, 40S, 40SW, 40W, 40NW are each directly connected to a single circuit segment 26N, 26NE, 26E, 26SE, 26S, 26SW, 26W, 26NW respectively and are located on the circuit board just to the outside and in the center of the longest parallel line of each circuit segment 26. These eight LEDs individually illuminate only when the conductive ink screen 36I on the bottom surface 36 contacts the circuit segment 26 connected to the specific LED. This illumination is viewable by the operator through one of eight small holes 50N, 50NE, 50E, 50SE, 50S, 50SW, 50W, 50NW in upper housing member 12. This illumination allows the operator to visually determine exactly what directional information he is giving the computer.

Table 1, below, describes what output signal lines 48A-D are activated when a directional switch containing a circuit segment 26 is closed. Table 1 also shows through which diodes 38A-H and through which LEDs 40N, 40NE, 40E, 40SE, 40S, 40SW, 40W, 40NW current flows when an associated switch is closed. The LED with a parenthetical "ON" is the only LED that is illuminated when the associated switch is closed.

TABLE 1

| SWITCH CLOSED CONTAINING CIRCUIT SEGMENT | LED | DIODE | ACTIVATED OUTPUT SIGNAL LINE |
|---|---|---|---|
| 26N | 40N (ON) | | 48A |
| 26NW | 40NW (ON) | | |
| | 40N | 38A | 48A |
| | 40W | 38B | 48B |
| 26W | 40W (ON) | | 48B |
| 26SW | 40SW (ON) | | |
| | 40W | 38C | 48B |
| | 40S | 38D | 48C |
| 26S | 40S (ON) | | 48C |
| 26SE | 40SE (ON) | | |
| | 40E | 38F | 48C |
| | 40S | 38E | 48D |
| 26E | 40E (ON) | | 48D |
| 26NE | 40NE (ON) | | |
| | 40N | 38H | 48A |
| | 40E | 38G | 48D |

When either auxiliary switch containing circuit segments 28L or 28R is closed, output signal 48E is activated and LEDs 40L or 40R connected to the auxiliary switches are both illuminated. This illumination is viewable by the operator through two small holes 50L and 50R located above the circular openings 39 in the upper housing member 12. Depending on what auxiliary information is to be input, the printed circuits can also be designated to allow individual illumination of only one of the LEDs 40L or 40R at a time.

In addition to the graphics layer and the LEDs illumination, the housing of the control unit also aids the operator to correctly input directional information. The upper housing member 12 has an octagonally shaped raised rim 90 bordering the octagonal opening 37 of the upper housing member 12 the rim 90 is located above and to the outside of the eight directional circuit segments 26. This rim 90 allows the operator by feel to determine where his hands are so that he may accurately close the desired directional switches while maintaining visual contact with the video display of a computer, video game or similar device.

The present invention thus has several advantages over prior art joystick equipped control units. The present invention can be hand held and directional information can be input with two hands. This two hand operation allows directional information to be input at a quicker rate than the standard joystick control units especially when a change in direction needs to be input. While one hand is completing the inputing of a first directional information, the second hand can immediately input different directional information. This speedier input is especially noticeable when a 180° change in direction needs to be input. The time needed for a joystick to travel from its original input position through the joystick's central or stationary position to the opposite directional input position is eliminated in the present invention as the operator's second hand can nearly instantaneously input this change in direction. This two hand operation also cuts down on operator fatigue.

Second, directional information is more accurately input with the present invention than with a joystick. When one inputs directional information with a joystick, many times the operator does not know what has been input until he sees the response on a video display. The present invention allows the operator to better determine what directional information is being input at the time of input. The graphics on the top surface 34 of the conductive/graphics layer 20, the raised rim 90 of the upper housing member 12, and the LEDs 40 that are illuminated upon a directional switch closure all allow more reliable directional information to be input.

Third, since the control unit of the present invention essentially has no moving parts it is less subject to mechanical failure than a control unit equipped with a joystick to mechanical failure.

While the above described embodiments are in accordance with the present invention, it is understood that the same is not limited thereto, but is susceptible of numerous changes as known to a person skilled in the art, and therefore this invention is not limited to the details shown and described herein, but intended to cover all such changes and modifications as are obvious to one of ordinary skill in the art.

What is claimed is:

1. An omnidirectional input device comprising:

a circuit board;

eight directional switches having an open and closed position arranged in an octagonal directional pattern, each switch comprising first and second conductive interleaved circuit segments mounted on said circuit board, a pad having a conductive surface arranged adjacent to and generally coextensive with said circuit segments and operably connectable to said conductive circuit segments to operably connect said first conductive segment to said second conductive segment to place said switch in said closed position, and a nonconductive layer intermediate said conductive surface and said conductive circuit segments to normally maintain said circuit segments and said conductive surface in a spaced apart relationship and to normally maintain said switch in said open position;

four directional output signal lines coupled to said circuit board;

a diode decoding matrix connected intermediate each of said eight switches and said four directional output signal lines for determining which of said directional switches is in said closed position and for coupling said directional switches in said closed position to one or more of said four directional output signal lines;

eight light emitting diodes each capable of being illuminated and respectively coupled to one of said eight switches and illuminated when said respectively coupled switch is in said closed position.

* * * * *